(12) United States Patent
Dowd

(10) Patent No.: US 9,421,635 B1
(45) Date of Patent: *Aug. 23, 2016

(54) PROCESS FOR FORMING AN AIR COOLED TURBINE AIRFOIL

(71) Applicant: Florida Turbine Technologies, Inc., Jupiter, FL (US)

(72) Inventor: Adam R Dowd, Stuart, FL (US)

(73) Assignee: S&J DESIGN LLC, Jupiter, FL (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/101,761

(22) Filed: Dec. 10, 2013

Related U.S. Application Data

(63) Continuation of application No. 13/652,509, filed on Oct. 16, 2012, now Pat. No. 8,881,397.

(51) Int. Cl.
| | |
|---|---|
| *F01D 5/18* | (2006.01) |
| *B23K 15/00* | (2006.01) |
| *F01D 5/28* | (2006.01) |
| *F01D 5/14* | (2006.01) |
| *B22C 9/10* | (2006.01) |
| *B23P 15/02* | (2006.01) |

(52) U.S. Cl.
CPC ............... *B23K 15/0086* (2013.01); *B22C 9/10* (2013.01); *F01D 5/147* (2013.01); *F01D 5/18* (2013.01); *F01D 5/284* (2013.01); *B23P 15/02* (2013.01); *F05D 2230/31* (2013.01); *Y10T 29/49336* (2015.01); *Y10T 29/49341* (2015.01)

(58) Field of Classification Search
CPC ............ B22F 7/04; B22F 3/105; B23P 15/02; F01D 9/02
USPC ........ 29/889.7, 889.721; 415/115, 116, 90 R, 415/92, 96 R, 97 R; 416/189, 191; 164/132
See application file for complete search history.

(56) References Cited

U.S. PATENT DOCUMENTS

2009/0148305 A1* 6/2009 Riahi et al. .................. 416/97 R

* cited by examiner

*Primary Examiner* — David Bryant
*Assistant Examiner* — Ruth G Hidalgo-Hernande
(74) *Attorney, Agent, or Firm* — John Ryznic

(57) ABSTRACT

A process of forming an air cooled turbine airfoil using a metal additive process, where the airfoil is formed by first producing a ceramic core having an internal cooling circuit shape, and then building up the airfoil over the ceramic core. The ceramic core is then leached away, and the outer surface of the airfoil is machined to remove rough surfaces formed by the metal additive process.

3 Claims, 2 Drawing Sheets

PROCESS FOR FORMING AN AIR COOLED TURBINE AIRFOIL

CROSS-REFERENCE TO RELATED APPLICATIONS

This application is a continuation of U.S. patent application Ser. No. 13/652,509 filed on Oct. 16, 2012 and entitled METHOD FOR TESTING VARIABLE COOLING GEOMETRIES IN A TURBINE VANE.

GOVERNMENT LICENSE RIGHTS

None.

BACKGROUND OF THE INVENTION

Field of the Invention

The present invention relates generally to a gas turbine engine, and more specifically to a method for testing different internal cooling air passages within an air cooled airfoil such as a rotor blade or a stator vane.

Description of the Related Art including information disclosed under 37 CFR 1.97 and 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

The first stage rotor blade and stator vanes are exposed to the highest gas stream temperatures, with the temperature gradually decreasing as the gas stream passes through the turbine stages. The upper stage airfoils (blades and vanes) must be cooled by passing cooling air through internal cooling passages and discharging the cooling air through film cooling holes to provide a blanket layer of cooling air to protect the hot metal surface from the hot gas stream.

A turbine stator vane can be tested for cooling effectiveness by passing a hot gas stream through the vane while monitoring the pressure differential and the temperature change of the cooling air. Measuring for the inlet pressure and the outlet pressure will provide for the pressure drop through the cooling circuit. Measuring the cooling air temperature entering the cooling circuit and then exiting the cooling circuit will determine the cooling effectiveness of the cooling circuit. This method of testing vane cooling circuits is very expensive if each vane must be cast separately using the standard investment casting technique. For example, an industrial gas turbine engine can have 20 vanes in one stage. If each vane in the stage were designed with a different cooling circuit, the casting tooling for each circuit could cost around $100,000 to produce for testing. The total cost for 20 vanes would be $2 million for the set of vanes.

BRIEF SUMMARY OF THE INVENTION

A method and an apparatus for testing different airfoil cooling circuit designs and picking the best design, where a number of cooling circuits are designed and a ceramic core is produced for each of the designs. Then, a metal additive process is used to form the metal airfoil over each of the different ceramic cores to form an air cooled turbine airfoil of one type for use in a stage of a turbine. The airfoils are then mounted in an engine or a test rig and a hot gas stream is passed through the airfoils. Cooling air is supplied to each of the airfoils and measured for a pressure differential and a temperature differential. Based on the pressure and temperature differentials, the most effective cooling design can be determined.

Using a metal additive manufacturing process to form the airfoils each having a different internal cooling air circuit is much less than using the conventional investment casting process and therefore the cost to design an airfoil cooling circuit is much cheaper using the present invention. Building up the metal over the ceramic cores and then leaching away the ceramic material results in a smooth surface for the cooling air passages. This process produces a smooth surface finish on the internal cooling channels that cannot be formed using a metal additive process without a ceramic core.

DETAILED DESCRIPTION OF THE INVENTION

The present invention is a method of testing different cooling circuits in a stator vane used in a turbine of a gas turbine engine, where the vanes with the different internal cooling circuits are produced using a ceramic core with the vane formed over the ceramic core using an additive manufacturing process such as electron beam melting (EBM), electron beam welding (EBW), Digital Direct Manufacture (DDM), or a metal printing process such as that developed by Mikro Systems, Inc. of Charlottesville, Va.

Figure 1:
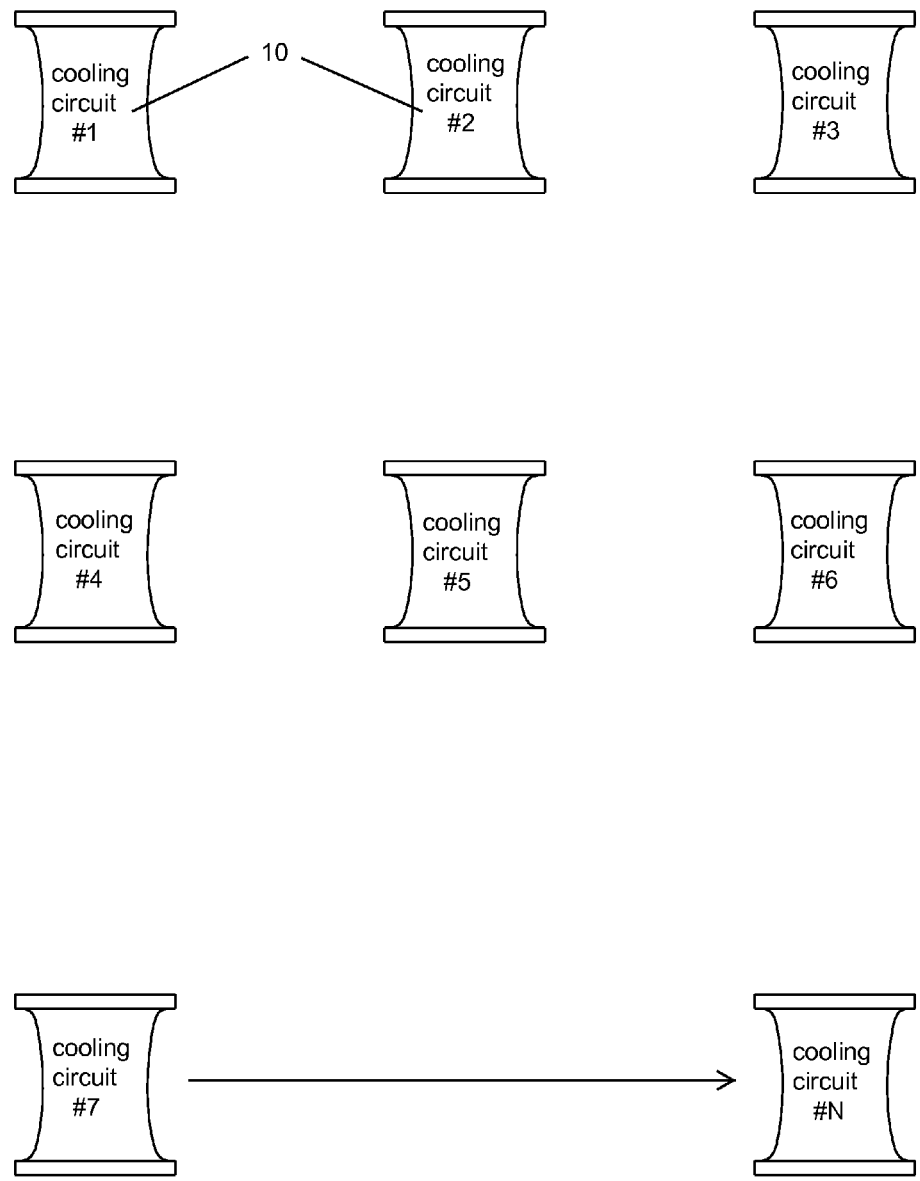
FIG. 1 shows a representation of a row of stator vanes in a gas turbine engine according to the present invention.

As an example, a stage of a turbine can have 20 stator vanes. To test cooling circuits, 20 stator vanes would be formed each having a different internal cooling circuit. Each of the 20 cooling circuits would have formed a ceramic core used to form the internal cooling circuit in the vane. Each stator vane would then be formed over the ceramic core using one of the metal additive manufacturing processes such as wire fed digital direct manufacturing to form the metal vane over the ceramic core. This process reduces the cost for manufacturing the vane from $100,000 to $15,000 per vane. FIG. 1 represents an industrial gas turbine engine that has 20 stator vanes in the first stage of the engine. In FIG. 1, N identical stator vanes 11 are represented, each having a different internal cooling circuit.

When the vane outer surfaces that include the airfoil and the inner and outer endwalls are formed, the ceramic core is leached away to leave the internal cooling air circuit. Building up the metal vane over the ceramic core and then leaching away the ceramic material leaves a very smooth cooling air surface formed within the metal vane. A process to form the metal vane without a ceramic core would leave a very rough surface on the cooling passages, and the rough surfaces could not be smoothed because of the extreme difficulty in reaching the surfaces within the vane. Then, the outer surfaces of the vane are machined to produce a smooth and accurate outer surface for the vane. With this machining step, accurate aero results can also be tested for. Any film cooling holes can be drilled into the vanes after machining of the outer surfaces. Each of the 20 vanes is formed this way in which each vane would have a different internal cooling circuit.

The vanes with the different internal cooling circuits are then placed in a test rig or an actual engine in the stage arranged in an annular array and a hot gas stream of a temperature to simulate the actual conditions that the vanes will be exposed to if the vanes are mounted in a test rig. The cooling air pressure and temperature for each vane is measured at both the inlets and the outlets for each vane. Thus, each vane will have a cooling air pressure drop and a cooling air temperature increase. The differential pressure and temperature for each vane can then be used to determine which of the internal cooling circuits provides the best results.

Figure 2:
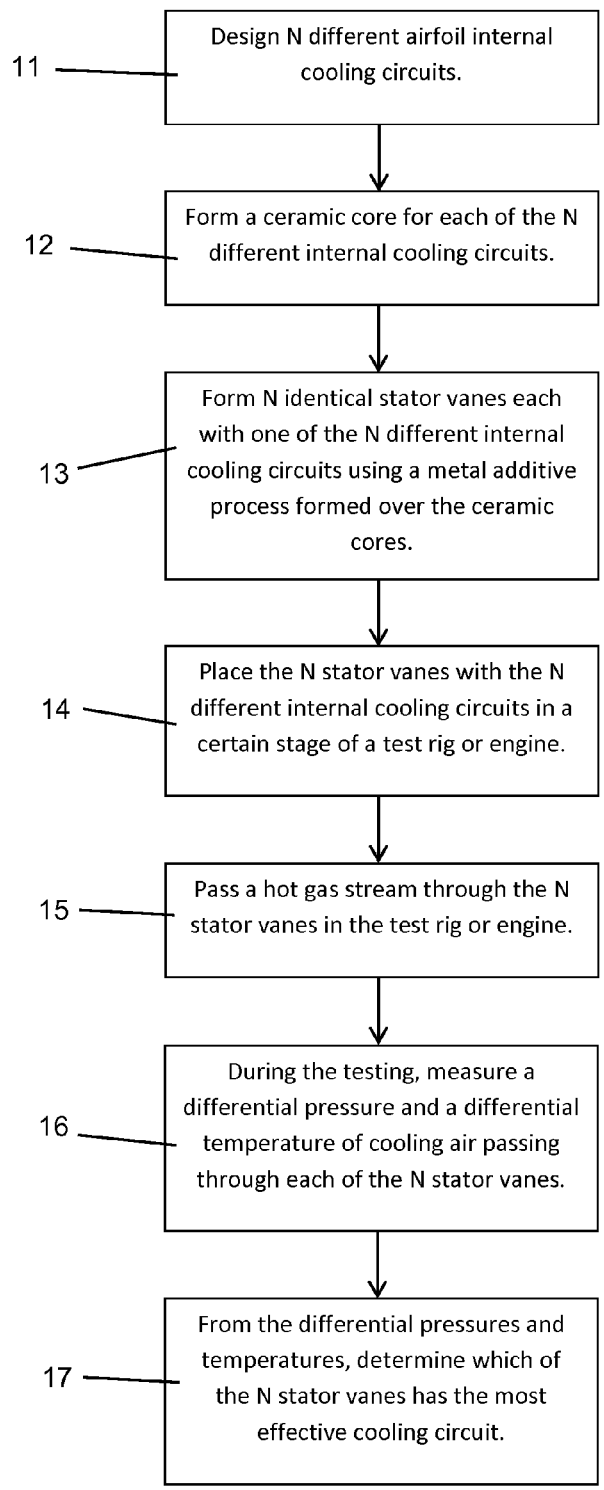
FIG. 2 shows a flow chart of the method for testing variable cooling geometries in a turbine vane according to the present invention.

FIG. 2 shows the method of determining which vane cooling circuit design produces the best cooling effectiveness. In step 11, a designer comes up with N different cooling circuits with one cooling circuit for each of the vanes in a certain stage of the turbine. However, for a turbine stage having N vanes, less than N cooling circuit designs could be used. Step 12 is to form a ceramic core for each of the different cooling circuit designs N. Step 13 is to form a stator vane for each of the different cooling circuits N where each vane is an identical vane for use in the same stage of the engine or test rig. Step 14 is to place the N vanes with the different cooling circuits in a test rig or engine. Step 15 is to pass a hot gas stream through the vanes to simulate a real condition that the vanes would be exposed to in real operation. Step 16 is to measure each of the N vanes for differential pressure and differential temperature. Differential pressure is a difference between the inlet pressure to the cooling circuit and the outlet pressure. Differential temperature a difference between the inlet temperature of the cooling air into the cooling circuit and the outlet temperature. Step 17 is to determine from the differential pressures and temperatures which vane cooling circuit design produces the best results. Once the best cooling circuit design is determined, the entire stage of stator vanes can then be cast or produced with each having the same internal cooling circuit.

I claim the following:

1. A process of forming an air cooled turbine airfoil comprising the steps of:
    forming a ceramic core having an airfoil internal cooling circuit shape;
    forming a metal airfoil over the ceramic core using a metal additive process;
    leaching away the ceramic core from the metal airfoil; and,
    machining an outer surface of the metal airfoil to a desired finish.

2. The process of forming an air cooled turbine airfoil of claim 1, and further comprising the step of:
    the metal additive process is an electron beam melting (EBM) process, or an electron beam welding (EBW) process, or a Digital Direct Manufacture (DDM), or a metal printing process.

3. The process of forming an air cooled turbine airfoil of claim 1, and further comprising the step of:
    the step of finishing the outer surface of the airfoil is to remove a rough surface produced by the metal additive process.

* * * * *